E. DE GOUNEVITCH.
DEVICE FOR LIGHTING AND EXTINGUISHING GAS BURNERS AT GIVEN HOURS.
APPLICATION FILED MAR. 8, 1909.
936,120.
Patented Oct. 5, 1909.
3 SHEETS—SHEET 1.
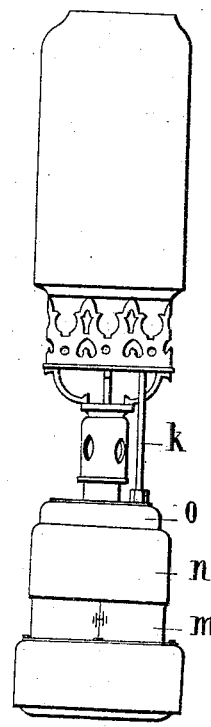
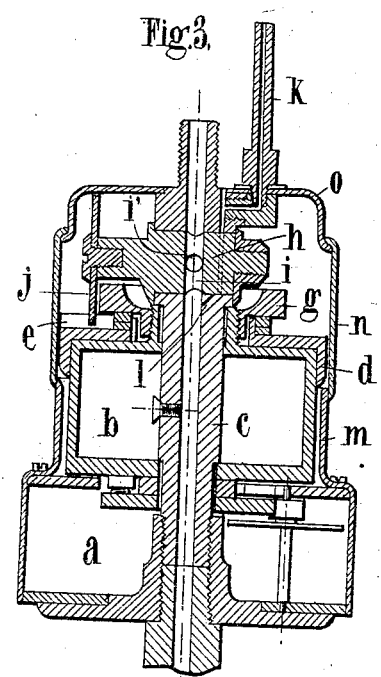
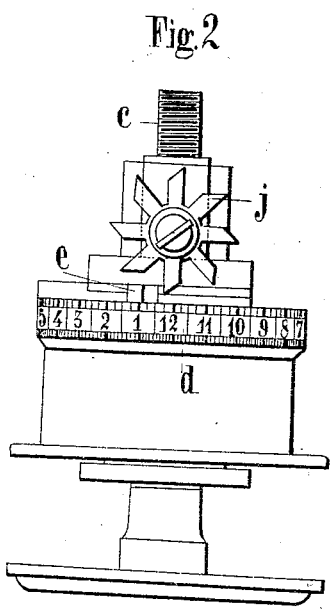
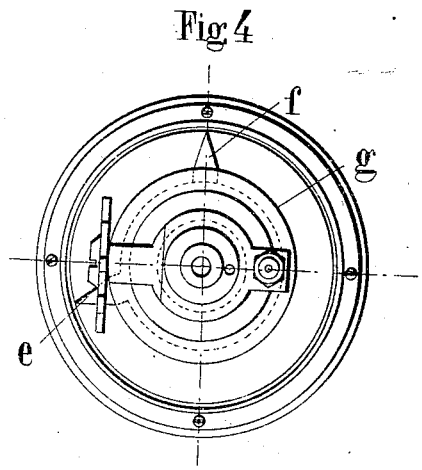
WITNESSES
INVENTOR
Etienne de Gounevitch,
BY
Edson Bro's,
ATTORNEYS

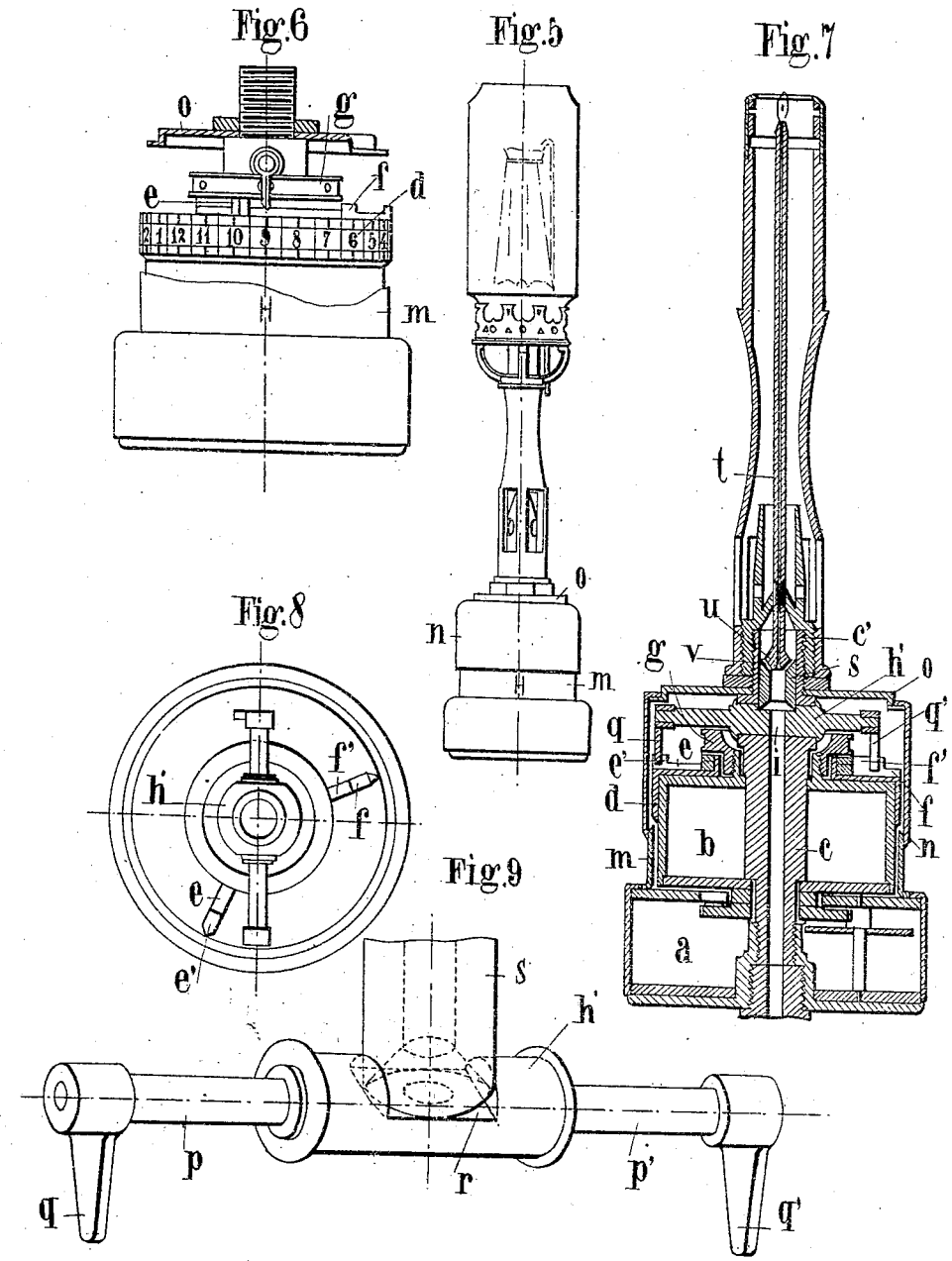

E. DE GOUNEVITCH.
DEVICE FOR LIGHTING AND EXTINGUISHING GAS BURNERS AT GIVEN HOURS.
APPLICATION FILED MAR. 8, 1909.
936,120.
Patented Oct. 5, 1909.
3 SHEETS—SHEET 3.
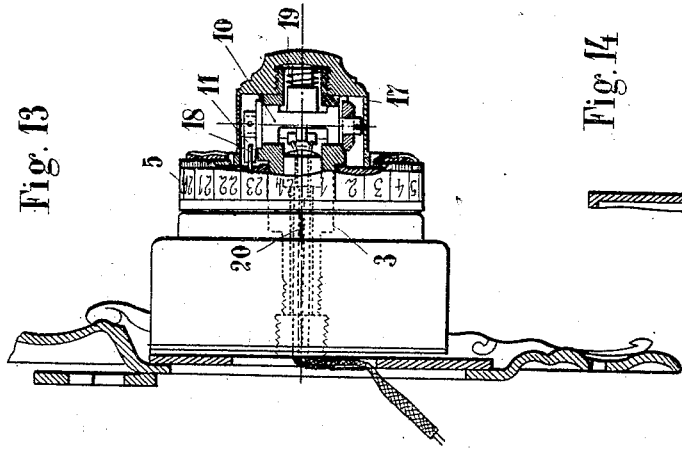
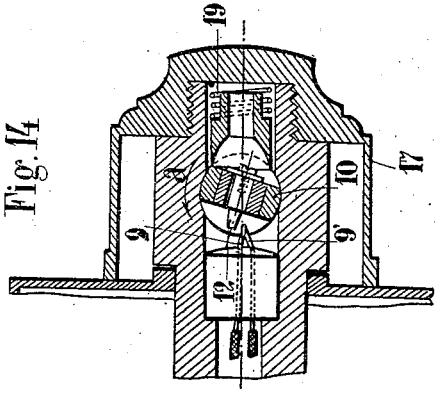
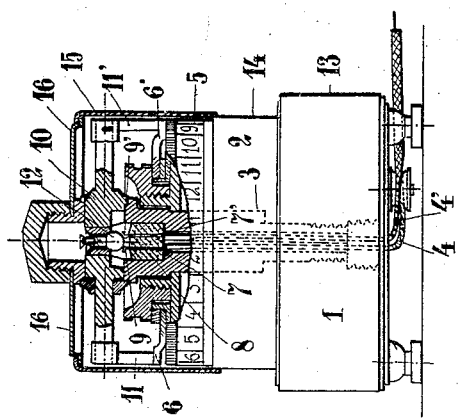
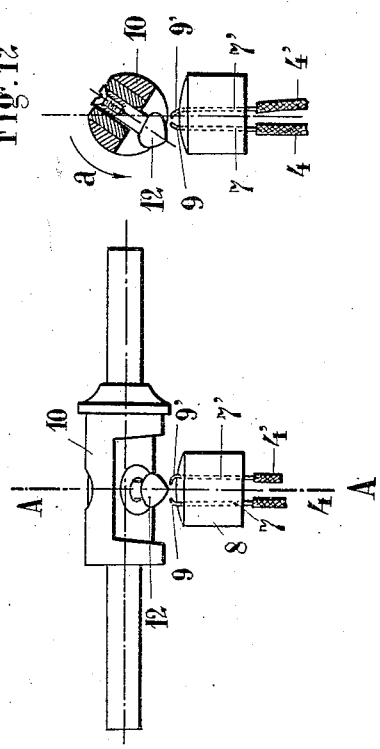
WITNESSES
INVENTOR
Etienne de Gounevitch,
BY
Edson Bros,
ATTORNEYS

UNITED STATES PATENT OFFICE.

ETIENNE DE GOUNEVITCH, OF PARIS, FRANCE.

DEVICE FOR LIGHTING AND EXTINGUISHING GAS-BURNERS AT GIVEN HOURS.

936,120. Specification of Letters Patent. Patented Oct. 5, 1909.

Application filed March 8, 1909. Serial No. 481,911.

*To all whom it may concern:*

Be it known that I, ETIENNE DE GOUNEVITCH, a subject of the Emperor of Russia, and resident of Paris, France, have invented a new and useful Device for Lighting and Extinguishing Gas-Burners at Given Hours, which device is fully set forth in the following specification.

This invention relates to a device for automatically lighting and extinguishing gas burners at predetermined hours which may be however modified. The same device could also be applied to the lighting and extinguishing of electric lamps.

A device according to this invention is illustrated by way of example in the accompanying drawings.

Figure 1 is an elevation showing the whole of a gas burner provided with the lighting and extinguishing apparatus. Fig. 2 is a view of the lighting and extinguishing apparatus on an enlarged scale. Fig. 3 is a vertical section of the same device. Fig. 4 is a plan. Figs. 5-9 show a modification of the device shown in Fig. 1. Fig. 5 is an elevation showing the whole of a gas burner provided with a lighting and extinguishing device. Fig. 6 is an elevation on an enlarged scale showing the outside arrangement of the extinguishing and lighting device. Fig. 7 is a vertical section of the same device. Fig. 8 is a plan. Fig. 9 is a perspective view giving details of the cock. Fig. 10 is a view, partly in elevation, and partly in vertical section, of the device for lighting and extinguishing electric lamps. Fig. 11 is an elevation on an enlarged scale of a detail of the apparatus shown in Fig. 10. Fig. 12 is a cross-section on line A—A of Fig. 11. Fig. 13 is an elevation partly in vertical section, of the apparatus designed so as to bring about by hand for instance the lighting of an electric lamp, the extinguishing being effected automatically after the expiration of a certain alterable period of time. Fig. 14 is a vertical section on an enlarged scale, showing details of the switch of the device shown in Fig. 13.

As shown in Figs. 1 to 4, the lighting and extinguishing device comprises a clockwork movement $a$, one movable part of which only is shown in Fig. 3. The spring, not shown in the drawing, which operates the clockwork in question, is arranged in the barrel $b$, the spindle $c$ of which is constituted by the conduit admitting gas to the burner.

The circumference of the drum is provided with a kind of dial $d$ divided into 24 hours; 12 hours for the day, and 12 hours for the night. On the upper face of the barrel $b$ are mounted two hands $e$ $f$ secured to and rendered integral with the barrel by means of a nut which nevertheless on being unscrewed enables the said hands to be moved independently of each other. The hands $e$ $f$ indicate, in fact, on the dial $d$, one—the hour for opening the burner, and the other—the closing hour. These hours can be changed by moving the hands as just explained.

The spindle or gas conduit $c$ and the clockwork $a$ are stationary: while the barrel $b$ rotates about the spindle $c$. On the conduit $c$ is mounted a cock $h$ provided with two holes $i$ $i'$ at 90°. The plug of the said cock is constituted by an eight-branched star $j$, four branches of which correspond to the two openings $i$ $i'$ which intersect, while the other branches are the intermediate ones. The star in question is arranged in such manner that its branch which happens to be in the bottom position, meets the hands $e$ $f$ rotating with the barrel. The dial $d$ is set so that the figure of the dial $d$ passing to the right of the bottom branch of the star $j$ indicates the exact hour. A by-pass $k$ which receives its gas at $l$ from the conduit $c$ in front of the cock $h$, is constantly alight when the burner is extinguished. In these conditions, assuming that the burner is provided with a by-pass and that the hand $e$ indicates by its position on the dial $d$ the hour for opening the burner, it will be understood that, when the hand in question arrives against the bottom branch of the star, it will move the latter to the extent of one branch, which movement will be sufficient to bring the cock $h$ from the closed position in which it was originally to the position in which one of the openings $i$ or $i'$ coincides with the conduit $c$. The gas passing freely into the said conduit, goes to the burner and ignites on contact with the flame of the by-pass which is then extinguished.

The hand $f$ indicating by its position the hour of closing of the burner, will at that precise moment strike the bottom branch of the star $j$ which it will also move to the extent of one-eighth of a revolution. In doing that, it will bring the cock into such position that the openings $i$ or $i'$ will no longer coincide with the conduit $c$, so that the burner will be extinguished.

A second lighting of the burner will take place exactly 24 hours after the first, unless the position of the hand $e$ has been modified, by a new contact of the hand in question with the star $j$. The same applies to the extinguishing by means of the hand $f$.

The winding of the clockwork is effected simply by rotating the barrel $b$.

The lighting and extinguishing device can be inclosed into a casing in three parts $m$ $n$ $o$, which will not in any way interfere with the rotation of the cock, but will prevent on the contrary any fraudulent tampering with the device, the adjustment of the hands indicating the opening and closing, remaining in the hands of the person who has the means for opening the casing in question.

The construction of the lighting and extinguishing device shown in Figs. 5–9, has also a clockwork movement $a$, only one wheel of which is shown in Fig. 7. The spring, not shown, which operates this clockwork is arranged in the barrel $b$, the spindle $c$ of which is constituted by the conduit used for the passage of the gas passing to the burner.

A dial $d$ divided into 24 hours as already described, occupies the circumference of the barrel, on the upper face of which are arranged two hands $e$ $f$, secured to the barrel by means of a nut $g$ which on being unscrewed enables the hands in question to be moved independently of each other. Each of these hands is secured to a divided or split ring surrounding the central portion of the dial. The two rings corresponding to the hands, are superposed on each other. By unscrewing the nut, the rings will no longer be pressed against the dial arranged above the barrel, and owing to the slot with which each ring is provided and which gives the ring a certain play around the central portion of the dial, the two rings become absolutely independent of each other, and one of them may be rotated, without moving the other. When the two hands occupy the desired position, the nut is again tightened and presses the two rings against the dial and fixes them, and by this tightening the hands are caused to participate in the movement of the dial.

On the conduit $c$ is mounted a cock $h'$ provided with one single opening $i$. The spindle of this cock is provided at each of its ends $p$ $p'$ with a vertical finger or projection $q$ $q'$ situated in the path of the hands $e$ $f$. Nevertheless the hand $e$ which may be the opening hand, is provided with a projection $e'$ of such a length that it strikes the projection $q$ but misses the projection $q'$. The hand $f$ is provided with a projection $f'$ which on the contrary can strike the finger $q'$ and miss the finger $q$. The cock $h'$ can oscillate to a certain extent, the said oscillation being produced in one direction (opening) by the passage of the hand $e$ under the arm $q$ and in the other direction (closing) by the passage of the hand $f$ under the arm $q'$. The opening and the closing take place, therefore, as already described at given hours, by the suitable arrangement of the indicating hands on the dial.

A recess $r$ made in the cock $h'$, the flat bottom of which carries a hollow cylindrical part which can move with slight amount of friction in the extension $c'$ of the gas conduit, makes it possible, by the movement which it gives to that part, to close the passage of the gas going to the burner, while leaving the passage for the gas going to the by-pass open.

In order to obtain the result in question, the small central tube $t$ which feeds the by-pass is provided at its bottom end with a conical thickened portion $u$ to which corresponds a conical recess of the part $s$. The cock being in the open position, there is between the cone $u$ and the part $s$ an empty space $v$ through which the gas can pass into the burner. When, however, the closing is brought about by the engagement of the arm $q'$ with the hand $f$, and the cock $h'$ oscillates, the oscillation in question produces, as will be understood, the raising of the part $s$ which becomes pressed against the cone $u$. The passage $v$ no longer existing, and owing to the openings of the cock still communicating a little with the conduit $c$, the slight quantity of gas supplied will pass only to the pipe $t$ in order to feed the by-pass.

When the cock $h'$ returns to the open position, the part $s$ is again lowered, and the passage $v$ again formed for admitting gas which becomes ignited at the top of the burner on contact with the flame of the by-pass.

This arrangement of the lighting and extinguishing device can also be provided with a safety casing made for instance of three parts $m$ $n$ $o$ which will not in any way interfere with the rotation of the cock but will, on the contrary, prevent any fraudulent tampering with the device.

This invention relates also to the application of the same device for bringing about the passage of current into an electric lamp and extinguishing the lamp in question at given hours which, however, can be modified, or for the purpose of, after having closed by hand the circuit at any desired moment, automatically obtain the opening of the same circuit after a certain period which can be regulated by the means supplied by the invention, and in that case the device can be used not only for electric lighting, but also for working an audible signal or other apparatus which are electrically disengaged. Figs. 10–14 of the accompanying drawings illustrate by way of example a device suitable for the said various applications.

The electric lighting and extinguishing device shown in Figs. 10 to 12 employs the construction already described of the clockwork movement and of the spring operating the same, the clockwork being arranged at 1 and the spring at 2 in the barrel, the spindle 3 of which is hollow in order to afford passage to the conductor wires 4 4'. The dial 5 and the hands 6 6' are also similar to the construction previously described. The wires 4 4' suitably insulated in their passage through the spindle 3, terminate respectively at 7 7' in a block 8 of insulating material, the end of the said wires forming contacts at 9 9'. On the other hand, the oscillating part 10 carrying fingers 11 11' already described, receives in a suitable recess a metal part 12 of a special shape which is suitably insulated from the said oscillating part.

The apparatus as described, is inserted into the circuit of the lamp or lamps the lighting and extinguishing of which at given hours it has to control.

At the time of the extinction, the part 10 occupies the position shown in Fig. 12, in which the part 12 is moved away from the contacts 9 9' and in which consequently the current cannot pass from 9 to 9'. But at the hour fixed for the lighting, the finger 11, for instance, is met by the hand 6, the result of which is that the part 10 is oscillated in the direction of the arrow $a$ (Fig. 12) and the part 12 comes into contact with the contacts 9 9' (Fig. 10). The circuit of the lamp or lamps being closed on the said contacts, the lighting is obtained. At the hour fixed for the extinguishing, it is on the contrary the finger 11' which is met by the hand 6', and the part 10 oscillates in the opposite direction. The contact part 12 returns to the position shown in Fig. 12, and there is an interruption in the passage of current from 9 to 9'. The extinguishing thus takes place. This arrangement of the electric extinguishing and lighting device can also be inclosed in a safety casing 13 14 15 16 (Fig. 10) which does not in any way interfere with the oscillation of the part 10, but prevents any tampering with the clock.

With the apparatus shown in Figs. 13 and 14, it is possible, by a simple manipulation, to bring about the lighting of a lamp or of a series of electric lamps at once, and to determine at the same time the period during which they are to remain alight. In order to make the thing clear, it will be assumed that the apparatus plays the part of a switch for one or more lamps lighting a staircase or passage. In this construction, the spindle of the oscillating part 10 will merely be provided with one finger 11 capable of engaging with a projection 18 driven by the clockwork. When the apparatus is at zero, that is to say, when it is not wound up, the projection 18 is in contact with the finger 11 which is pushed back, and the part 10 is in the position shown in Fig. 14, in which the contact part 12 is disengaged from the contacts 9 9'. That is, therefore, the period of extinguishing of the lamp or lamps. If it is desired to light the lamp for going down the staircase or passing the passage, it is sufficient to turn the dial 5 in the suitable direction. The projection 18 will at once release the finger 11, and owing to the action of a spring 19 mounted under a cap 17, the part 10 will oscillate in the direction of the arrow $a$ (Fig. 14) in such manner that the part 12 will establish contact between 9 and 9'. The lamp or lamps will then be lighted. But on turning the dial 5, the period of lighting has been determined by placing a division of the said dial in front of an index 20 which in normal times indicates the zero. If, therefore, the dial has been moved to the extent of two divisions of 5 minutes each, the apparatus has been wound for 10 minutes, and the lamps will be automatically extinguished at the end of that period of time, as the dial will return at that moment to the zero, and the projection 18 to contact with the finger 11, the result of which will be the return of the part 10 to the position shown in Fig. 14.

The same apparatus, and more particularly the construction shown in Fig. 10, could also be utilized for ringing an electric bell and any electrically released apparatus which has to work for given periods of time, whether variable or invariable.

Claim.

In a device for automatically lighting and extinguishing gas burners at given hours, the combination, of a burner with the pipe supplying gas to the burner, of a clock movement the barrel of which is mounted to rotate about said pipe as a spindle, a cock arranged to oscillate, an intermediate part adapted to be raised and lowered by the oscillation of said cock for closing and opening a passage for the gas going to the burner, fingers carried by said cock, hands adjustably mounted on the barrel of the clock movement for indicating the hours of lighting and extinguishing and provided with projections adapted to engage the respective fingers on said cock whereby the feeding of gas to the burner is automatically controlled as desired, and a small pipe supplying a by-pass which remains constantly in communication with the gas supply pipe.

In testimony whereof I have signed this specification in the presence of two subscribing witnesses.

ETIENNE DE GOUNEVITCH.

Witnesses:
 EMILE LEDRET,
 H. C. COXE.